United States Patent
Hartmann (10) Patent No.: US 9,333,709 B2
(45) Date of Patent: May 10, 2016

(54) DEVICE AND METHOD FOR PRODUCING THREE-DIMENSIONAL MODELS

(75) Inventor: Andreas Dominik Hartmann, Stadtbergen (DE)

(73) Assignee: VOXELJET AG, Friedberg (DE)

( * ) Notice: Subject to any disclaimer, the term of this patent is extended or adjusted under 35 U.S.C. 154(b) by 628 days.

(21) Appl. No.: 13/634,099

(22) PCT Filed: Mar. 29, 2011

(86) PCT No.: PCT/DE2011/000343
§ 371 (c)(1),
(2), (4) Date: Sep. 11, 2012

(87) PCT Pub. No.: WO2011/124204
PCT Pub. Date: Oct. 13, 2011

(65) Prior Publication Data
US 2013/0000549 A1    Jan. 3, 2013

(30) Foreign Application Priority Data

Mar. 31, 2010   (DE) .......................... 10 2010 013 732

(51) Int. Cl.
*B05C 19/04*      (2006.01)
*B05C 19/06*      (2006.01)
*B29C 67/00*      (2006.01)
(Continued)

(52) U.S. Cl.
CPC .............. *B29C 67/0081* (2013.01); *B05C 19/04* (2013.01); *B05C 19/06* (2013.01); *B29C 31/02* (2013.01); *B29C 67/0077* (2013.01); *B05C 11/023* (2013.01); *B22F 3/008* (2013.01); *B22F 3/1055* (2013.01); *B22F 2003/1056* (2013.01)

(58) Field of Classification Search
None
See application file for complete search history.

(56) References Cited

U.S. PATENT DOCUMENTS 3,291,233 A * 12/1966 Mayer .............................. 177/81
3,762,014 A * 10/1973 Klein ........................... 29/25.03
(Continued)

FOREIGN PATENT DOCUMENTS

AU           720255 B2     5/2000
DE           4300478       8/1994
(Continued)

OTHER PUBLICATIONS

Cima et al., "Computer-derived Microstructures by 3D Printing: Bio- and Structual Material," SFF Symposium, Austin, TX, 1994.
(Continued)

*Primary Examiner* — Binu Thomas
(74) *Attorney, Agent, or Firm* — The Dobrusin Law Firm, P.C.

(57) ABSTRACT

The present invention relates to a device for manufacturing three-dimensional models by means of a 3D printing process, whereby a build platform for application of build material is provided and a support frame is arranged around the build platform, to which said support frame at least one device for dosing the particulate material and one device for bonding the particulate material is attached via the guiding elements and the support frame is moveable in a Z direction, which essentially means perpendicular to the base surface of the build platform. In so doing, the device provides a material feeding device having a particle material container to supply particulate material in batches from the storage area to the dosing apparatus and to do so with the least possible amount of shearing forces and without significant interaction with the atmosphere.

19 Claims, 5 Drawing Sheets

(51) Int. Cl.
*B29C 31/02* (2006.01)
*B22F 3/105* (2006.01)
*B05C 11/02* (2006.01)
*B22F 3/00* (2006.01)

(56) References Cited

U.S. PATENT DOCUMENTS

| | | | |
|---|---|---|---|
| 4,575,330 A | 3/1986 | Hull | |
| 4,665,492 A | 5/1987 | Masters | |
| 4,752,352 A | 6/1988 | Feygin | |
| 4,863,538 A | 9/1989 | Deckard | |
| 4,938,816 A | 7/1990 | Beaman et al. | |
| 4,944,817 A | 7/1990 | Bourell et al. | |
| 5,017,753 A | 5/1991 | Deckard | |
| 5,053,090 A | 10/1991 | Beaman et al. | |
| 5,059,266 A | 10/1991 | Yamane et al. | |
| 5,076,869 A | 12/1991 | Bourell et al. | |
| 5,127,037 A | 6/1992 | Bynum | |
| 5,132,143 A | 7/1992 | Deckard | |
| 5,134,569 A | 7/1992 | Masters | |
| 5,136,515 A | 8/1992 | Helinski | |
| 5,140,937 A | 8/1992 | Yamane et al. | |
| 5,147,587 A | 9/1992 | Marcus et al. | |
| 5,149,548 A | 9/1992 | Yamane et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,216,616 A | 6/1993 | Masters | |
| 5,248,456 A | 9/1993 | Evans, Jr. et al. | |
| 5,252,264 A | 10/1993 | Forderhase et al. | |
| 5,284,695 A | 2/1994 | Barlow et al. | |
| 5,296,062 A | 3/1994 | Bourell et al. | |
| 5,316,580 A | 5/1994 | Deckard | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A | 2/1995 | Cima et al. | |
| 5,431,967 A | 7/1995 | Manthiram et al. | |
| 5,482,659 A | 1/1996 | Sauerhoefer | |
| 5,490,962 A | 2/1996 | Cima et al. | |
| 5,506,607 A | 4/1996 | Sanders, Jr. et al. | |
| 5,555,176 A | 9/1996 | Menhennett et al. | |
| 5,573,055 A | 11/1996 | Melling et al. | |
| 5,582,231 A | 12/1996 | Siak et al. | |
| 5,597,589 A | 1/1997 | Deckard | |
| 5,616,294 A | 4/1997 | Deckard | |
| 5,639,070 A | 6/1997 | Deckard | |
| 5,639,402 A | 6/1997 | Barlow et al. | |
| 5,647,931 A * | 7/1997 | Retallick et al. | 264/308 |
| 5,658,412 A | 8/1997 | Retallick et al. | |
| 5,730,925 A | 3/1998 | Mattes et al. | |
| 5,740,051 A | 4/1998 | Sanders, Jr. et al. | |
| 5,753,274 A | 5/1998 | Wilkening et al. | |
| 5,807,437 A | 9/1998 | Sachs et al. | |
| 5,851,465 A | 12/1998 | Bredt | |
| 5,902,441 A | 5/1999 | Bredt et al. | |
| 5,902,537 A | 5/1999 | Almquist et al. | |
| 5,943,235 A | 8/1999 | Earl et al. | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,116,517 A | 9/2000 | Heinzl et al. | |
| 6,120,231 A * | 9/2000 | Christ et al. | 414/422 |
| 6,133,353 A | 10/2000 | Bui et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,165,406 A | 12/2000 | Jang et al. | |
| 6,193,922 B1 | 2/2001 | Ederer | |
| 6,217,816 B1 | 4/2001 | Tang | |
| 6,259,962 B1 | 7/2001 | Gothait | |
| 6,305,769 B1 | 10/2001 | Thayer et al. | |
| 6,322,728 B1 | 11/2001 | Brodkin et al. | |
| 6,355,196 B1 | 3/2002 | Kotnis et al. | |
| 6,375,874 B1 | 4/2002 | Russell et al. | |
| 6,395,811 B1 | 5/2002 | Nguyen et al. | |
| 6,401,001 B1 | 6/2002 | Jang et al. | |
| 6,403,002 B1 | 6/2002 | Van Der Geest | |
| 6,416,850 B1 | 7/2002 | Bredt et al. | |
| 6,423,255 B1 | 7/2002 | Hoechsmann et al. | |
| 6,436,334 B1 | 8/2002 | Hattori et al. | |
| 6,467,525 B2 | 10/2002 | Herreid et al. | |
| 6,476,122 B1 | 11/2002 | Leyden | |
| 6,500,378 B1 | 12/2002 | Smith | |
| 6,554,600 B1 | 4/2003 | Hofmann et al. | |
| 6,610,429 B2 | 8/2003 | Bredt et al. | |
| 6,672,343 B1 * | 1/2004 | Perret et al. | 141/95 |
| 6,733,528 B2 | 5/2004 | Abe et al. | |
| 6,764,636 B1 | 7/2004 | Allanic et al. | |
| 6,838,035 B1 | 1/2005 | Ederer et al. | |
| 7,004,222 B2 | 2/2006 | Ederer et al. | |
| 7,049,363 B2 | 5/2006 | Shen | |
| 7,137,431 B2 | 11/2006 | Ederer et al. | |
| 7,387,359 B2 | 6/2008 | Hernandez et al. | |
| 7,497,977 B2 | 3/2009 | Nielsen et al. | |
| 2001/0050031 A1 | 12/2001 | Bredt et al. | |
| 2002/0026982 A1 | 3/2002 | Bredt et al. | |
| 2002/0090410 A1 * | 7/2002 | Tochimoto et al. | 425/215 |
| 2002/0111707 A1 | 8/2002 | Li et al. | |
| 2003/0083771 A1 | 5/2003 | Schmidt | |
| 2004/0012112 A1 | 1/2004 | Davidson et al. | |
| 2004/0035542 A1 | 2/2004 | Ederer et al. | |
| 2004/0038009 A1 | 2/2004 | Leyden et al. | |
| 2004/0056378 A1 | 3/2004 | Bredt et al. | |
| 2004/0094058 A1 | 5/2004 | Kasperchik et al. | |
| 2004/0104515 A1 | 6/2004 | Swanson et al. | |
| 2004/0145088 A1 | 7/2004 | Patel et al. | |
| 2004/0170765 A1 * | 9/2004 | Ederer et al. | 118/256 |
| 2005/0017394 A1 | 1/2005 | Hochsmann et al. | |
| 2005/0093194 A1 | 5/2005 | Oriakhi et al. | |
| 2005/0167872 A1 * | 8/2005 | Tsubaki et al. | 264/113 |
| 2005/0174407 A1 | 8/2005 | Johnson et al. | |
| 2005/0219942 A1 * | 10/2005 | Wallgren | 366/30 |
| 2005/0280185 A1 * | 12/2005 | Russell et al. | 264/308 |
| 2006/0175346 A1 * | 8/2006 | Ederer et al. | 118/303 |
| 2007/0215020 A1 * | 9/2007 | Miller | 110/245 |
| 2008/0001331 A1 | 1/2008 | Ederer | |
| 2010/0007062 A1 * | 1/2010 | Larsson et al. | 264/485 |
| 2010/0212584 A1 | 8/2010 | Ederer et al. | |
| 2010/0243123 A1 | 9/2010 | Ederer | |
| 2010/0247742 A1 * | 9/2010 | Shi et al. | 118/712 |
| 2013/0004610 A1 * | 1/2013 | Hartmann et al. | 425/162 |

FOREIGN PATENT DOCUMENTS

| | | |
|---|---|---|
| DE | 4440397 | 9/1995 |
| DE | 19545167 A1 | 6/1997 |
| DE | 19851224 C1 | 5/2000 |
| DE | 19853834 | 5/2000 |
| DE | 19928245 A1 | 1/2001 |
| DE | 20107262 U1 | 8/2001 |
| DE | 10224981 B4 | 8/2004 |
| DE | 69634921 T2 | 12/2005 |
| DE | 102005056260 A1 | 6/2007 |
| DE | 102006030350 A1 | 1/2008 |
| DE | 102006055326 A1 | 5/2008 |
| DE | 202009000825 U1 | 3/2009 |
| DE | 102007050679 A1 | 4/2009 |
| EP | 0361847 B1 | 4/1990 |
| EP | 0431324 | 2/1994 |
| EP | 0431924 B1 | 1/1996 |
| EP | 0644809 B1 | 7/2001 |
| EP | 1415792 | 5/2004 |
| EP | 1872928 A1 | 1/2008 |
| WO | 00/78485 A2 | 12/2000 |
| WO | 01/96048 A1 | 12/2001 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |

(56) References Cited

FOREIGN PATENT DOCUMENTS

| WO | 2004/010907 A1 | 2/2004 |
|---|---|---|
| WO | 2005/097476 A2 | 5/2005 |
| WO | 2005/082603 A1 | 9/2005 |
| WO | 2005/113219 A1 | 12/2005 |
| WO | 2007/039450 A1 | 4/2007 |
| WO | 2011/124204 A1 | 10/2011 |

OTHER PUBLICATIONS

Sachs et al., "Three-Dimensional Printing: Rapid Tooling and Prototypes Directly from a CAD Model", Massachusetts Institute of Technology, pp. 131-136.
Sachs et al., "Three-Dimensional Printing: Rapid Tooling and Prototypes Directly from a CAD Model", Massachusetts Institute of Technology, pp. 143 & 151, Jan. 1990.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal, Apr. 2000.
Williams, "Feasibility Study of Investment Casting Pattern Design by Means of Three Dimensional Printing", Department of Mechanical Engineering, pp. 2-15, Jun. 1987.
Gephart, Rapid Prototyping, pp. 118-119, 1996.
Marcus et al., Solid Freeform Fabrication Proceedings, Nov. 1993.
Marcus, et al., Solid Freeform Fabrication Proceedings, Sep. 1995, p. 130-33.
Related U.S. Appl. No. 13/583,989, filed Sep. 11, 2012, Published as 2013/0004610.
Related U.S. Appl. No. 12/681,957, filed Apr. 7, 2010, published as 2010/0212584.
International Search Report, Application No. PCT/DE2011/000343, dated Jul. 29, 2011, published as WO2011/124204A1.
International Preliminary Report on Patentability, Application No. PCT/DE2011/000343, dated Oct. 2, 2012.
German Office Action dated May 28, 2013, Application No. 102010013732.4.
US 4,937,420, 06/1990, Deckard (withdrawn)

* cited by examiner

Figure 5

DEVICE AND METHOD FOR PRODUCING THREE-DIMENSIONAL MODELS

CLAIM OF PRIORITY

This application is a national phase filing under 35 USC §371 from PCT Application serial number PCT/DE2011/000343 filed on Mar. 29, 2011 published as WO02011/124204. This application further claims priority from 102010013732.4 filed on Mar. 31, 2010 both incorporated herein by reference.

The invention relates to a device for manufacturing three-dimensional models by a 3D printing method as expressed in the generic concept of patent claim 1 and a method for manufacturing three-dimensional models by a 3D printing method according to patent claim 8.

A method for producing three-dimensional objects from computer data is described in the European patent specification HP 0 431 924 B1. In this method, a particulate material is deposited in a thin layer onto a platform which, if needed, is surrounded by a chamber and then a binder material is selectively printed on the particulate material using a print head according to computer data. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

The object produced from the solidified particulate material is embedded in loose particulate material as described above and such is subsequently removed therefrom. This is done, for example, using an extractor. This leaves the desired objects, from which the remaining powder is removed, e.g. by brushing.

Other powder-supported rapid prototyping processes work in a similar manner, for example, selective laser sintering or electron beam sintering, in which a loose particulate material is also deposited in layers and selectively solidified with the aid of a controlled physical radiation source.

All these methods are referred to collectively below as "three-dimensional printing methods" or "3D printing methods".

It is known from the prior art of DE 102 24 981 B4 of another 3D printing method particularly for building casting patterns. In this method, a particulate material, e.g. quartz sand, is mixed with liquid hardener and deposited in a thin layer onto a build platform. A liquid binder is subsequently dosed over selected areas and this binder reacts with the hardener, thereby causing the desired areas of the particulate material to solidify. After multiple repetitions of this process, an individually formed body can be created from the bonded particulate material. This body is initially embedded in the surrounding, unbonded particulate material and can be removed from the particle bed following completion of the building process.

With all the aforementioned 3D printing methods, the provision of a build container with the vertically lowerable build platform located within requires a high technical effort in respects to sealing of the chamber wall against the platform to prevent the particulate material from uncontrollably flowing out through the gap between the edge of the build platform and the chamber wall, otherwise the danger exists that the platform will jam against the chamber wall due to the possibly grainy particulate material.

Another disadvantage of the lowerable build platform is the constantly increasing weight on the build platform to be moved as the building process progresses. In particular during application of the new layer, it may be necessary to lower the powder bed by more than the layer thickness and then raise it again to the dimension required in order to adjust the layer thickness with sufficient accuracy. In the case of such a revolving operation, not only the total weight of the powder feedstock including the build platform must be overcome, but also the frictional forces of the powder bed relating to the chamber walls and the seal friction between the build platform and chamber wall. This results in high loads for the guides and drives, especially when dealing with large build spaces and high feedstock thicknesses of the particulate material employed.

In this regards it is known from the prior art of EP 0 644 809 B1 and DE 10 2006 030 350 A1 of a method whereby the particle bed is not lowered relatively to the worktable, but rather the coating apparatus and the print head used for applying the particulate material and binder are raised relative to the particle bed. Thus it is known from the prior art that a coater for particulate material and a print head are attached to a support frame and thereupon arranged.

This type of 3D printing system is preferably employed for manufacturing relatively large and heavy mouldings. Large quantities of particulate material are needed for such systems and if the system is preloaded with this material, then it loads the support frame with heavy additional weight, at least at the beginning of the process. The big advantages of the system for vertically moving constant loads would be lost in this scenario. Therefore, the particulate material is preferably stationary, stored next to the system, and then supplied to the coating apparatus. However, a difficulty arises concerning how to convey the particulate material to the level of the coating apparatus, which is constantly changing during the building process. The methods used by other 3D printing systems to convey particulate material are not suitable for this purpose.

For example, it is suggested in DE 201 07 262 U1 to use a spiral conveyor to move particulate material from a large system-external storage silo and supply it to a smaller storage silo situated in the 3D printing system itself. However, spiral conveyors require relatively large turning radii when negotiating changes in direction and only permit small elastic deformations when in operation. That is why the conveyor line can be relatively long (depending on the system size). This results in large quantities of particulate material that are required to "prime" the conveyor line before the material arrives at the coater. If it is necessary to switch to a different particulate material, then this material must be reconveyed back to the storage silo.

If, for example, the particulate material is mixed with the liquid hardening components prior to the printing order run and the moisture content of this mixture must be maintained as uniform as possible, then a spiral conveyor is eliminated as an option due to the fact that conveying spirals generate frictional heat during operation and this heat, in conjunction with the large air volumes in the system plus constant turning-over of the particulate material surface, dries out the particulate material. Moreover, curved spiral conveyor systems are not able to convey material lying external to their radii. The particulate material builds up at these areas and forms deposits. These deposits can grow until they precipitate out as clumps, which are then fed to the coater and this, in turn, tends to cause breakdowns. In order to prevent this, the spiral conveyor must be regularly disassembled and cleaned. The time and cost expense of such actions increases in proportion to the conveyor line length.

If, for instance, sand is used as the particulate material, then the service life of a spiral conveyor system will be limited due to the fact that the transport of sand entails friction, which causes the sand to be highly abrasive. Furthermore, the abrasion of the conveyor spiral can impact negatively on the process.

If the particulate material is conveyed to the uppermost position and then supplied via a drop-out to the coater, then a portion of the mixed-in liquid medium may evaporate. The flow characteristics of the particulate material mixture are thereby modified. Since the vertical location of the coater is constantly changing during the process, this means that the flow behaviour of the particulate material mixture is also constantly changing.

Pneumatic conveyors are also ruled out for similar reasons since these would likewise subject the particulate material to high wind currents and thereby desiccate it in an uncontrolled way.

Therefore, one of the objects of the invention is to provide both a device for the described 3D printing system and a method which enables supply of adequate quantities of particulate material to the coater during object-building and in a fashion that is both simple and that involves the least amount of interaction with the atmosphere.

This object is achieved by a device according to patent claim 1 and a method according to patent claim 8.

According to the present invention, a device for manufacturing three-dimensional models by means of a 3D printing process is described, whereby a build platform for application of build material is provided and a support frame is arranged around the build platform, to which said support frame at least one device for dosing the particulate material and one device for bonding the particulate material is attached via the guiding elements, and the support frame is moveable in a Z direction, which essentially means perpendicular to the base surface of the build platform. In so doing, the device according to the invention provides a material feeding device having a particle material container to supply particulate material in batches from the storage area to the dosing apparatus and to do so with the least possible amount of shearing forces and without significant interaction with the atmosphere.

One example of a device that can be used for bonding particulate material is a print head for dosing liquid droplets. When brought in contact with the particulate material, the liquid leads to locally confined bonding.

During the course of conveyance in batches of particulate material from a stationary silo to the dosing apparatus, the particulate material container of the device according to the invention has a certain return mechanism. According to a preferred embodiment of the invention, a batch contains less particulate material than is required for depositing all layers on the build platform. In such an embodiment of the invention, it is possible to reduce the weight of the coater.

Preferably, one batch should be sufficient to deposit at least one layer of particulate material to the build platform. In such an embodiment, the build process must not be interrupted until application of one particle layer is complete and this enables such to be implemented very accurately.

In particular, if the particular material container of the device according to the invention is vertically moveable, then filling of the coater can be carried out easily and without either loss or unnecessarily high air introduction.

If the particulate material container is moveable in the horizontal direction and/or pivotable, then it is feasible to fill the coater in various horizontal positions.

According to one particularly preferred embodiment of the present invention, the means for supplying has a chain trough conveyor and/or a conveyor belt.

The aforementioned object of the present invention is additionally achieved by provision of a method for manufacturing three-dimensional models using a 3D printing process comprising the following steps:

a) Depositing of one layer of particulate material from a dosing unit onto a stationary build platform;
b) Selective solidification of the particulate material by means of a bonding unit in accordance with one of the cross-sections corresponding to the model being manufactured;
c) Elevation of the dosing unit and, if required, the bonding unit by one particle layer thickness;
d) Repetition of steps a) to c) until the completed model is achieved.

During the manufacturing process according to the invention, the particulate material is refilled into the height-variable dosing device via supply of particulate material from the storage area in batches to the dosing apparatus by means of a material feeding device with a particle material container.

According to a preferred embodiment of the invention, the particulate material is mixed with a liquid medium prior to the layer-by-layer processing. Mixing of the entire amount of particulate material required for the process can take place in a mixing device prior to introduction into the process. The material would be supplied from a stationary silo, the storage area, in batches to the coating apparatus depending on the process progress. This procedure has the advantage that the mixing device is not contained within the process chain and therefore a malfunction thereof does not directly affect the process flow. On the other hand, the particulate material must be elaborately protected from separation or volatilisation of the liquid medium.

For this reason, the material mixture is advantageously manufactured with a mixer during the running process. Batch mixers are preferentially suited for this purpose. The mixer is supplied with particulate material as required, e.g. via a pneumatic conveyor line. The mixer weighs the particulate material in a prespecified quantity in the mixing chamber and adds the liquid hardening medium as per the selected recipe. After a specified mixing time, the material mixture is transported to a storage container. The storage container has e.g. filling level sensors which, if lower than a certain set point, indicate to the mixer control to make up the next batch of particulate material mixture. The storage container additionally has an e.g. pneumatically actuated flap to use for emptying thereof.

This is opened when the conveying crucible is situated under the flap. In this case, the material mixture flows under gravity into the conveying crucible. The filling height is determined by e.g. an arrangement that seals on top of material cones. The conveying crucible is then transported by means of a linear actuator at the required level above the coating apparatus. The conveying crucible is emptied there in a receiving container. The particulate material mixture is transported from the filling point e.g. via a spiral conveyor and distributed across the width of the coater. The receiving container including the distribution mechanism can be transported transversally along with the coating apparatus. In this case, the coater needs to fill the receiving container and to do this, it must move to a defined transfer position below the conveying crucible. In a preferred embodiment, the receiving container, including the distribution mechanism, is permanently attached to the support frame and can therefore only move vertically with it. In turn, attached to the distribution mechanism is a closing device that fills the coater with the particulate material mixture if its stock is exhausted. This has the advantage that the quantity of particulate material mixture that travels along with the coater is relatively small and therefore it exerts very small dynamic loads upon the support frame.

The material feeding device may have a feeding location for receiving the particulate material and a discharge location for discharging the particulate material. The feeding location may be positioned at a fixed location, such as underneath a stationary storage silo. The discharge location may be positioned at a location above a receiving container attached to a build frame. The discharge location may moves in the Z-direction as the build frame moves. For example, the material feeding device may have an angle of incline which adjusts as the build frame moves in the Z-direction.

The coater can subsequently apply a thin layer of particulate material mixture onto a vertically positioned build plane. Next comes the bonding step e.g. with the aid of a print head that doses a liquid, via individually controlled nozzles, onto an area that corresponds to one of the cross-sections of the body being built. This liquid reacts with the particulate material mixture and bonds the particle in the desired area and/or results in additional bonding with the particulate material mixture layer possibly situated directly below it. After this, the support frame is elevated by a unit equal to the thickness of the layer currently being processed, a new layer is applied and then bonded according to the new cross-section data. The sequential, process consisting of lifting, layer application and bonding will be repeated until the desired body is completed.

During this process, the coater travels multiple times to the receiving container to fill with fresh particulate material mixture that was prepared in several individual batches in the mixer and supplied to the receiving container via the conveyor line. As the process advances, the height of the structural body increases. While doing so, the vertical position of the support frame changes and consequently also the position of the receiving container. Correspondingly, the transfer position of the conveying crucible in the receiving container migrates upward in the vertical direction.

Lastly, the non-bonded particulate material is removed. To do this, the build plane is moved to a side and out of the device and another build plane is possibly moved into the device on the opposite side, so that the build process can be restarted while the previous structural body is freed from surrounding particulate material.

For the purpose of more detailed explanation, the invention is described in further detail below on the basis of preferred embodiments with reference to the drawing.

IN THE DRAWINGS

Figure 1:
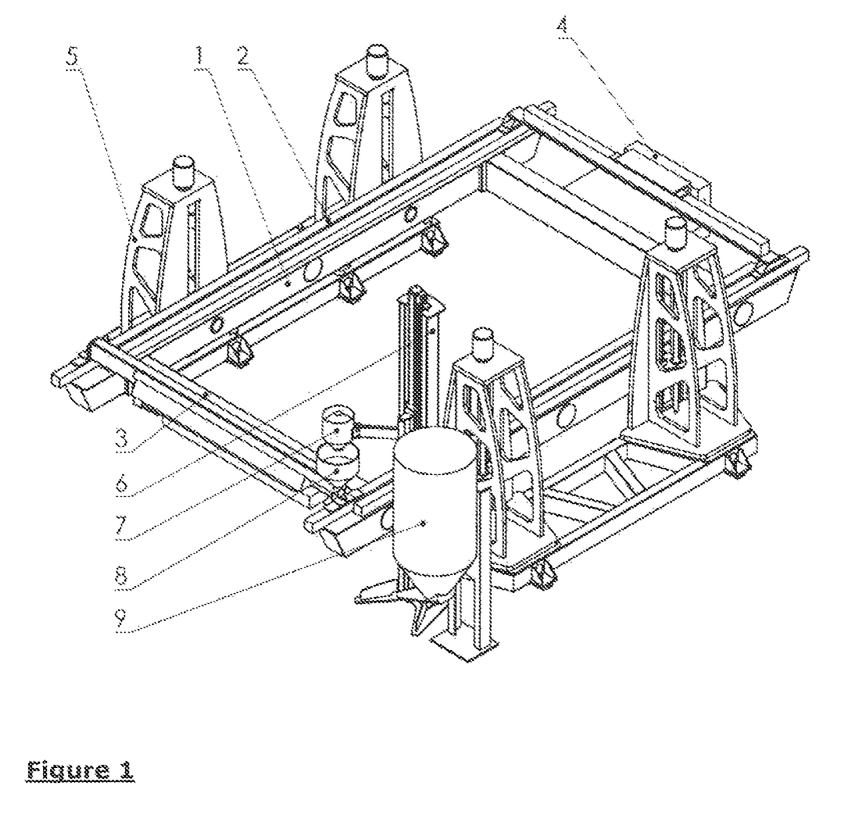
FIG. 1 A spatial representation of one preferred embodiment of the present invention.

FIG. 2 *a*) to *c*) A side view of the device during various filling process steps during the build process;

FIGS. 3 *a*) and *b*) Filling process steps at various filling heights of the support frame;

FIG. 1 shows an isometric view as an application example of a device that can be used to manufacture 3D models. In addition to other features, this displayed preferred device has a support frame (1) that is moveable in the vertical direction and/or in the X direction by means of positioning units (5).

The support frame (1) carries the particle doser or coater (3) and the bonding unit, for example, a print head (4). The coater (3) and print head (4) can be moved over the length of the support frame (1). The space within the support frame (1) is the build space in which the models are built. The coater unit (3) and bonding unit (4) can access the entire build space.

The coater (3) is retained in its park position when the bonding unit (4) is located within a collision-endangering vicinity. When the coater (3) is located in park position, it can be filled with particulate material.

In a preferred embodiment of the invention, the coater (3) only carries enough particulate material for safely applying one layer of the build process. With such an embodiment, the coater (3) is reloaded after every applied layer with the appropriate particle quantity.

When depositing the next layer, the first step involves elevating the support frame (1) by one layer thickness in the vertical direction. When doing so, this also changes the refilling position of the coater (3).

FIG. 1 shows the refilling device for the coater (3) according to one preferred embodiment. As means for supplying, the refining device has a lifting device (6), a conveying crucible (7) and a receiving container (8) as well as a storage area, respectively, a silo/mixer unit (9).

According to the invention, process-ready material can be dispensed at the outlet of the silo/mixer unit (9). In the preferred embodiment according to the invention shown in FIG. 2*a*, a vertically moveable lifting unit (6) brings a conveying crucible (7) under the outlet of the silo/mixer unit (9). After the conveying crucible (7) is filled, it is brought to the current height level of the support frame. Then it can be emptied into receiving container (8).

Figure 2A:
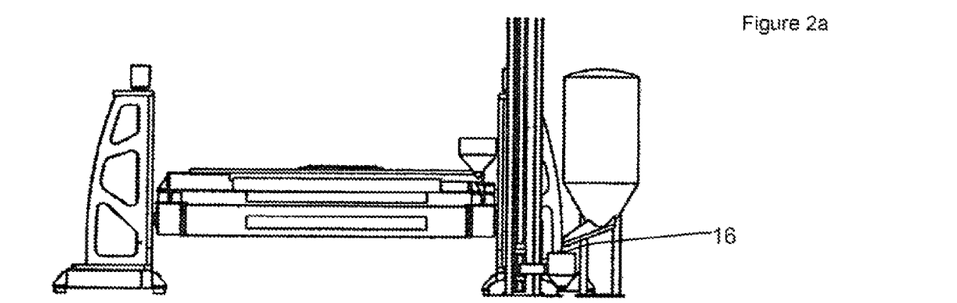

During transport of the particulate material, it continually comes in contact with the atmosphere, that is, with the oxygen of the air. The contact Is essentially limited to the surface. If stricter demands need to be met in regards to the particulate material being used, then the conveying crucible (7) can be implemented as a closeable unit. In this context, it is likewise possible to additionally create artificial atmospheres in conveying crucible (7).

The travel time to the vertical height level at the given build heights can be neglected as long as the vapour pressure of the fluid applied over the particulate material is moderate.

Since the transport crucible (7) is small and always filled right away, no changes to the bulk material as a result of bonding/solidifications are anticipated. If bulk materials are used that exhibit such behaviour, then the process can be ideally adjusted to such because the behaviour is always the same due to the constant filling height.

After the material arrives in the receiving container (8), it is distributed over the length of the coater (3). Spiral conveyors can be used here. These are implemented with lengths that are just long enough to enable uniform filling of the entire coater (3) with particulate material. Selection of short spiral conveyors ensures that the particulate material is not negatively affected.

Depending on the build process, it may prove necessary to transport various particulate materials in the coater (3). For such purposes, the conveying crucible (7) can be alternatively provided with different materials from several silos/mixer units (9).

In terms of material transport, it is conceivable that systems with several conveying crucibles could be used, for example, chain trough conveyors or conveyor belts.

Figure 2B:
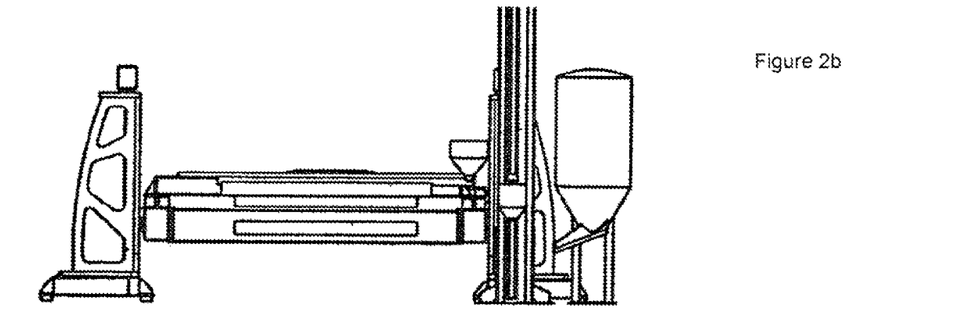
Figure 2C:
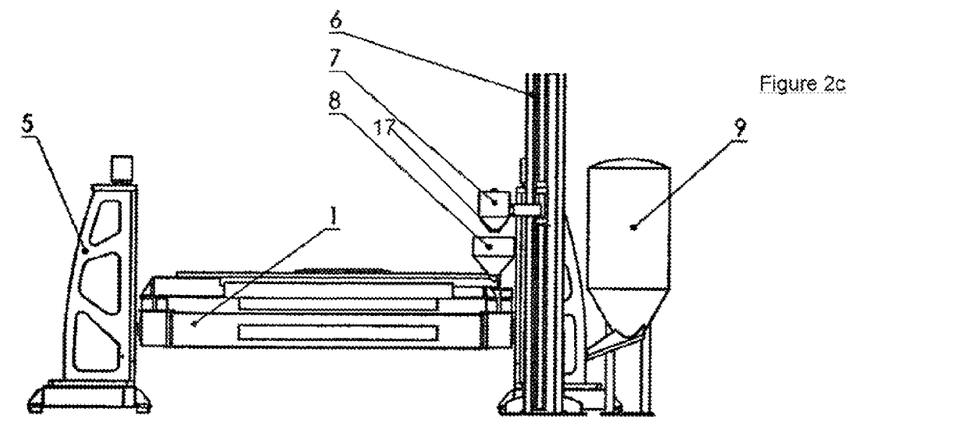

According to the preferred embodiment shown in FIGS. 1 and 2, the silo/mixer unit (9) has a low build height and the outlet is located considerably below the uppermost filling position. The conveying crucible is therefore not only vertically moveable, but additionally moveable in a second direction, horizontally.

An arrangement may also be provided that a silo/mixer unit (9) is suspended above the uppermost filling position. If such is done, then an additional movement direction is dispensed with. The conveying crucible (7) then brings the particulate material down to the receiving container (8). As with the previously described arrangement, it is likewise safeguarded against free fall and the atmosphere.

Both preferred embodiments also protect the support frame (1) from jolts due to powder material failing from great heights. It is easy to take-support frame (1) design considerations into account since the low "fall height" remains constant.

Equally preferable are embodiments in which multiple refilling devices are employed. These may prove necessary if material requirements increase.

According to the invention, other transport mechanisms can also be used that enable variable filling heights of the coater, operate batch-wise and thereby only create low free fall heights.

Figure 3A:
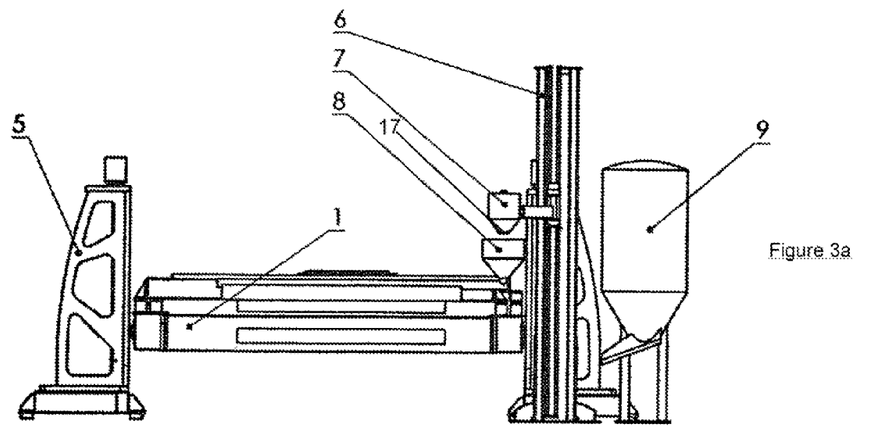
Figure 3B:
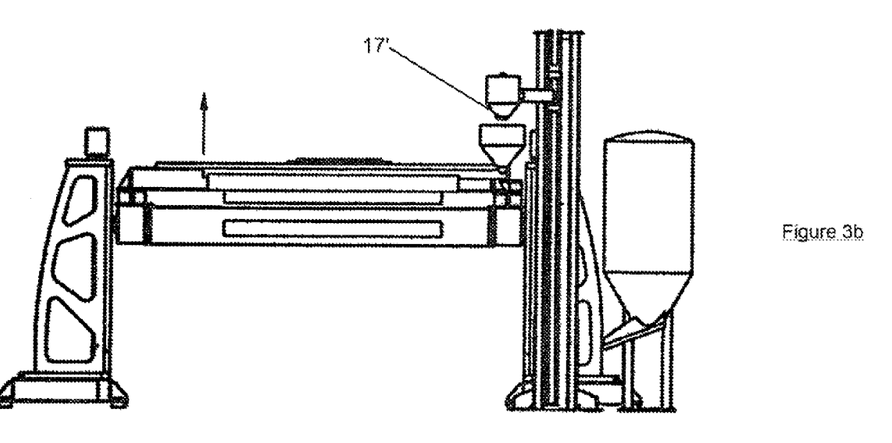

FIG. 3 depicts the filling process at various vertical locations of the support frame. FIG. 2 shows the filling process by itself. With reference to FIG. 2a, a material feeding device may have a feeding location 16 for receiving particulate material. The feeding location 16 in FIG. 2a is a fixed position beneath the silo 9. With reference to FIG. 2c, a material feeding device may have a discharge location 17 for discharging particulate material. The discharge location 17 is above the receiving container 8. With reference to FIGS. 3a and 3b, the discharge location 17, 17' is movable at least in the Z-direction from a first position 17 to a second position 17'.

Figure 4:
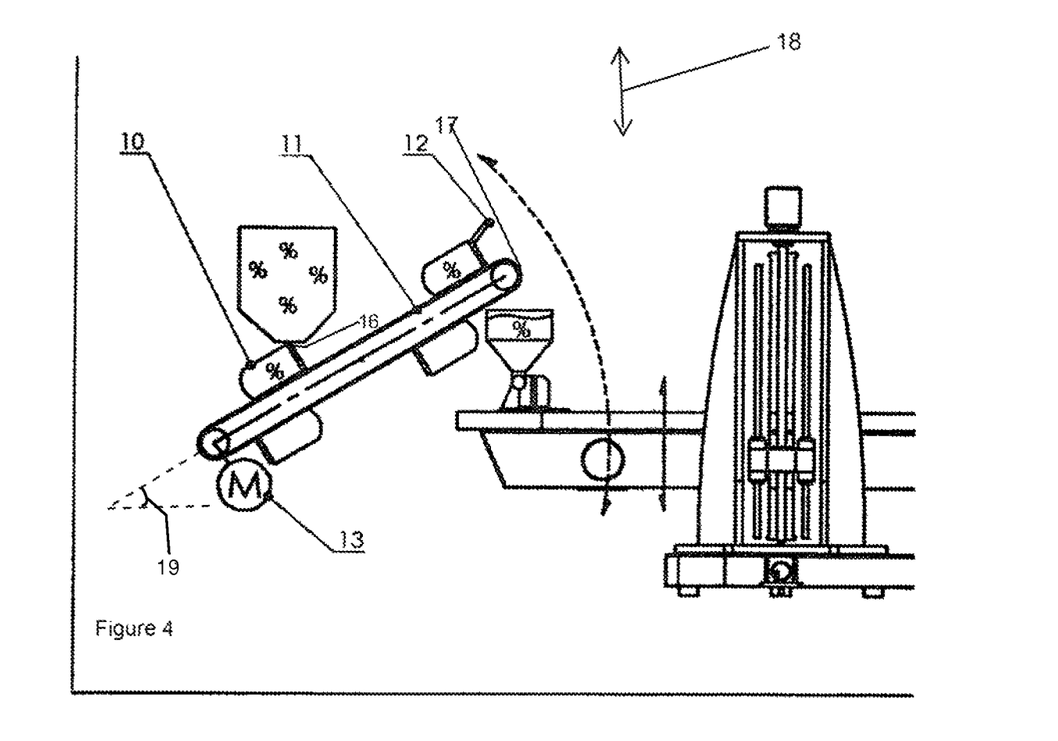
FIG. 4 A side-view representation of another device according to the invention with trough conveyor and closeable troughs.

FIG. 4 shows a device according to the invention that utilises a trough chain conveyor as a supply means. In this case, several troughs (10) are attached to a chain (11). They are filled at the silo/mixer unit and then emptied at the coater. Depending on the particulate material, the covers (12) can be used again to protect against vaporisation and/or oxidation. Depending on the process status of the production system, it is possible to have a control unit intermittently switch on the motors (13) of the drive chain.

Figure 5:
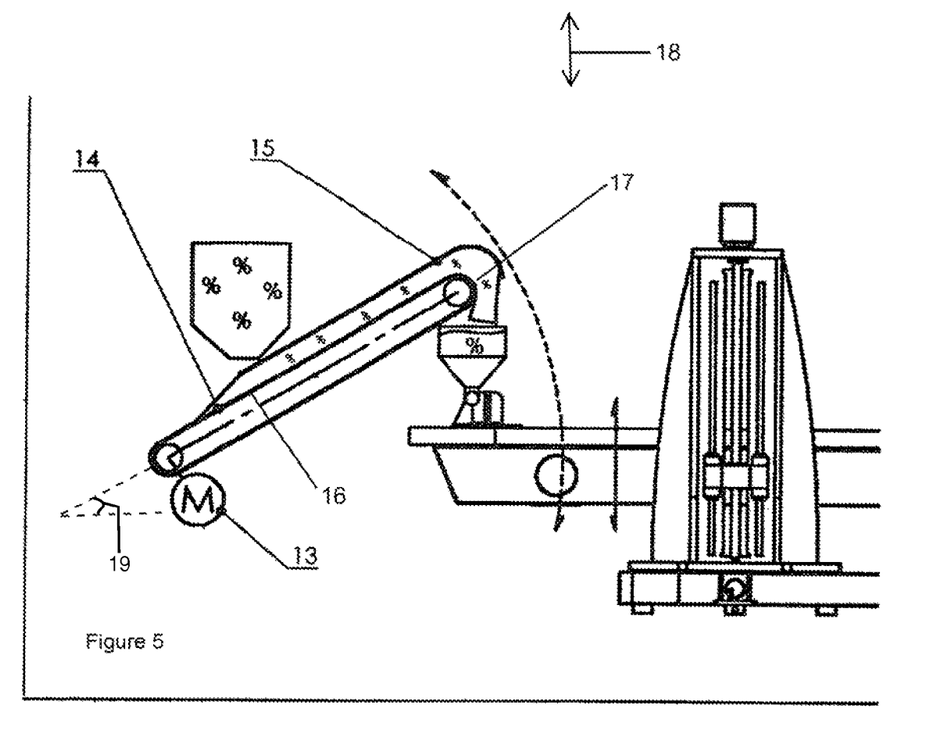
FIG. 5 A side-view representation of another device according to the invention with trough conveyor and roofed-over conveyor belt.

As shown in FIG. 5, it may be equally preferable to use a conveyor belt (14) as a supply means in terms of material transport. The particulate material is preferably transported close to the enclosing walls/barriers (15) in order to minimize atmospheric contact. Frictional effects are also present here, however, they are low compared to those associated with spiral conveyors. Here it is also possible to have a control unit intermittently switch on the motors (13) of the drive chain, depending on the process status of the production system.

With reference to FIGS. 4 and 5, the material feeding device (e.g., trough chain conveyor or belt conveyor) may have an angle of incline 19. For example, the trough 10 and chain 11 of a trough chain conveyor or a conveyor belt 14 may move at the angle of incline 19. The material feeding device has a feeding location 16 at a fixed position underneath the silo. The material feeding device has a discharge location 17 at a position above the receiving container. As the receiving container moves in the Z direction 18, the position of the discharge location 17 moves at least in the Z direction. As shown in FIGS. 4 and 5, the angle of incline 19 changes as the receiving container moves in the Z direction.

DESIGNATION LIST

1 Support frame
2 Positioning units in X direction
3 Coater
4 Print head
5 Positioning unit in Z direction
6 Lifting device
7 Conveying crucible
8 Receiving container
9 Silo/mixer unit
10 Troughs
11 Chain
12 Cover
13 Motors
14 Conveyor belt
15 Barriers
16 Feeding Location
17, 17' Discharge Location
18 Z-direction
19 Incline angle

The invention claimed is:

1. An apparatus for manufacturing three-dimensional models by means of a 3D printing process comprising:
   a build platform having a base surface for application of a build material including a particulate material and a liquid material;
   a support frame arranged around the build platform having guiding elements, to which said support frame is attached:
   i) at least one coater device for dosing the particulate material onto the build platform;
   ii) a receiving container for receiving the particulate material and for filling the coater device with the particulate material; and
   iii) a print head device for printing the liquid material using individually controlled nozzles for bonding the particulate material;
   at least two vertical positioning units for moving the support frame in a Z direction perpendicular to the base surface of the build platform;
   a stationary material storage device for storing the particulate material, and
   a material feeding device for supplying the particulate material in batches from the material storage device to the receiving container with the least possible amount of shearing forces to the particulate material and without significant Interaction of the particulate material with atmosphere;
   wherein the coater device and the print head are attached to the support frame via the guiding elements; and
   wherein the coating device, the print head and the receiving container move in the Z direction with the movement of the support frame;
   wherein the material feeding device has a fixed feeding location positioned below the stationary material storage device and a discharge location positioned above the receiving container and movable in at least the Z direction with an incline angle that adjusts as the build frame moves vertically;
   wherein the material feeding device includes an incline angle that adjusts as the build frame moves vertically, or the material feeding device includes a lifting device having a linear actuator that moves a conveying crucible to a height that adjusts as the build frame moves vertically.

2. The apparatus according to claim 1, wherein each of the batches contains less particulate material than is required for depositing all layers on the build platform.

3. The apparatus according to claim 1, wherein one batch is sufficient to deposit at least one layer of particulate material to the build platform.

4. The apparatus according to claim 1, wherein the material feeding device includes a conveying crucible for moving the particulate material vertically.

5. The apparatus according to claim 1, wherein the material feeding device includes a chain trough conveyor for moving the particulate material vertically.

6. The apparatus according to claim 1, wherein the material feeding device has a conveyor bet for moving the particulate material vertically.

7. The apparatus according to claim 4, wherein the conveying crucible has a cover.

8. The apparatus according to claim 2, wherein one batch is sufficient to deposit at least one layer of particulate material to the build platform.

9. The apparatus according to claim 2, wherein the material feeding device includes a conveying crucible for moving the particulate material vertically.

10. The apparatus according to claim 8, wherein the material feeding device includes a conveying crucible for moving the particulate material vertically.

11. The apparatus according to claim 2, wherein the material feeding device includes a chain trough conveyor for moving the particulate material vertically.

12. The apparatus according to claim 10, wherein the material feeding device includes a chain trough conveyor for moving the particulate material vertically.

13. The apparatus according to claim 2, wherein the material feeding device has a conveyor belt for moving the particulate material vertically.

14. The apparatus according to claim 8, wherein the material feeding device has a conveyor bet for moving the particulate material vertically.

15. The apparatus according to claim 1, wherein the apparatus includes a spiral conveyor for distributing the particulate material across the width of the coater device.

16. The apparatus according to claim 1, wherein the apparatus includes a mixing device for mixing the particulate material with a liquid medium prior to being transported by the material feeding device.

17. The apparatus according to claim 1, wherein the receiving device is permanently attached to the support frame so that the receiving container only moves in the vertical direction.

18. The apparatus of claim 8, wherein
i) the apparatus includes a spiral conveyor for distributing the particulate material across the width of the coater device; and
ii) the apparatus includes a mixing device for mixing the particulate material with a liquid medium prior to being transported by the material feeding device; and
iii) the receiving device is permanently attached to the support frame so that the receiving container only moves in the vertical direction.

19. An apparatus for manufacturing three-dimensional models by means of a 3D printing process comprising:
a build platform having a base surface for application of a build material including a particulate material and a liquid material;
a support frame arranged around the build platform having guiding elements, to which said support frame is attached:
  i) at least one coater device for dosing the particulate material onto the build platform;
  ii) a receiving container for receiving the particulate material and for filling the coater device with the particulate material; and
  iii) a print head device for printing the liquid material using individually controlled nozzles for bonding the particulate material;
at least two vertical positioning units for moving the support frame in a Z direction perpendicular to the base surface of the build platform;
a stationary material storage device for storing the particulate material, and
a material feeding device for supplying the particulate material in batches from the material storage device to the receiving container, wherein the material feeding device has a fixed feeding location positioned below the stationary material storage device, and a discharge location positioned above the receiving container and movable in at least the Z direction with an incline angle that adjusts as the build frame moves vertically;
wherein the coater device and the print head are attached to the support frame via the guiding elements;
wherein the coating device, the print head and the receiving container move in the Z direction with the movement of the support frame; and
wherein the material feeding device includes
  i. a conveying crucible for moving the particulate material vertically and a lifting device having a linear actuator that moves the conveying crucible to a height that adjusts as the build frame moves vertically; or
  ii. a chain trough conveyor for moving the particulate material vertically and includes an incline angle that adjusts as the build frame moves vertically; or
  iii. a conveyor belt for moving the particulate material vertically and includes an incline angle that adjusts as the build frame moves vertically.

* * * * *